United States Patent [19]
Zinter et al.

[11] Patent Number: 5,500,770
[45] Date of Patent: Mar. 19, 1996

[54] MACROLENS SYSTEM FOR EMISSION MICROSCOPY

[75] Inventors: J. Robert Zinter, Rochester; Paul L. Ruben, Penfield, both of N.Y.

[73] Assignee: Amarel Precision Instruments, Rochester, N.Y.

[21] Appl. No.: 366,524

[22] Filed: Dec. 30, 1994

[51] Int. Cl.$^6$ .............................. G02B 9/04; G02B 21/00; G02B 21/02
[52] U.S. Cl. ................. 359/793; 359/362; 359/368; 359/643; 359/656
[58] Field of Search ................................. 359/362–363, 359/368, 434–435, 641–647, 663, 656–661, 664, 691, 719, 754, 733–736, 741; 348/79, 126

[56] References Cited

U.S. PATENT DOCUMENTS 4,680,635  7/1987  Khurana ........................ 348/79
4,755,874  7/1988  Esrig ............................ 348/126

Primary Examiner—Thong Q. Nguyen
Attorney, Agent, or Firm—M. Lukacher

[57] ABSTRACT

A multiple lens element macrolens system operative as a single lens has a high light transmission value and a wide field of view of an object to be viewed. The macrolens system provides a long object working distance and an extended back focal distance to an image plane. An object group of lens elements is spaced by a substantial axial gap from an image group of lens elements. The gap and the working and back focal distances facilitate inclusion of various auxiliary components into an optical instrument which incorporates the macrolens system.

10 Claims, 3 Drawing Sheets

MACROLENS SYSTEM FOR EMISSION MICROSCOPY

FIELD OF THE INVENTION

The present invention generally relates to a macrolens system suitable for use in emission microscopy, and, more particularly, the invention relates to a multiple lens element macrolens system which functions as a single lens optimized to have a high light transmission value, a large field of view in the object plane, a large object working distance, a large back focal distance to the image plane, and a large gap between an object group and an image group of multiple lens elements.

BACKGROUND OF THE INVENTION

Emission microscopy is a rapidly evolving tool for detecting and characterizing certain defects or potential defects in semiconductor integrated circuits, wherein such defects or potential defects emit low levels of light when the integrated circuit is subjected to electrical activating signals. Faint radiation can be emitted from portions of electrically activated semiconductor integrated circuits by a number of fundamental mechanisms, such as, for example, by avalanche luminescence, by dielectric luminescence, and by so-called forward bias emission. Additionally, emission microscopy can provide a high resolution detection of high temperature regions or domains within a semiconductor integrated circuit.

An emission microscope is an optical microscope customized to provide particular features required to detect luminescence as well as to view a semiconductor integrated circuit under visible light conditions, so that defects generating light emission can be correlated with the physical and electrical layout of the integrated circuit. An emission microscope may include a higher magnification analytical probe station for microprobing certain sub-regions or domains of the integrated circuit, and alternatively, for selectively ablating material from certain domains of the integrated circuit or for conducting micro repair of certain domains. Other features of an emission microscope may be a high resolution and high sensitivity image capture system, image data storage means, image data processing means, and an image display system.

In order to provide "global" characterization of light emission of a semiconductor integrated circuit, the macrolens system of an emission microscope should provide at least the following features: (i) a high light transmission value through the lens system; (ii) a wide field of view of an object to be characterized, the field of view preferably covering all or at least a substantial portion of the area of the semiconductor integrated circuit object positioned in the object plane of the macrolens system; (iii) a spectral range of light transmitted through the macrolens system which includes visible light and radiation emitted by the integrated circuit under test; and (iv) sufficient spatial resolution (described as a modulation transfer function) of the macrolens system to detect desired details of the integrated circuit under test.

With respect to the light transmission value of a lens system, the amount of light transmitted through a lens is proportional to $(NAO)^2/(MAG)^2$, where NAO is the numerical aperture of the object and MAG is the overall magnification of the lens system. A macrolens system optimized to provide both a high light transmission value and a wide field of view at the object plane thereof has not been available heretofore, since these two features of a macrolens system cannot be readily obtained by simply combining two or more commercially available lens assemblies, such as, for example, two camera lens assemblies or two slide projector lens assemblies. For example, U.S. Pat. No. 4,680,635 to Khurana discloses in col. 3, lines 37–53 a microscope optics system utilizing two lenses (16 and 17) wherein a primary lens 16 has a high numerical aperture and a high magnification, and a secondary lens 17 is used to reduce the overall magnification of an image. That system, however, provides a substantially reduced field of view at the object plane, thereby necessitating multiple adjacent sub-areas to be imaged and characterized so as to generate a composite image comprising all or a substantial portion of the area of a semiconductor integrated circuit under test.

In U.S. Pat. No. 4,755,874 to Esrig et al, there is disclosed in FIG. 3 thereof a macro optic system 30 comprising back-to-back photo lenses which in combination provide a numerical aperture of at least 0.025 at an overall magnification of 1X (col. 2, line 68; col. 3, lines 64–65). While Esrig et al mention that the numerical aperture of the macro optic system 30 preferably is in the range from 0.17–0.34 or higher (col. 3, line 66), these authors also point out (col. 2, lines 10–13) that the requirement of a high numerical aperture and low magnification has not previously been available in lenses having sufficient quality. Moreover, Esrig et al do not suggest a design or configuration of a macro optic system which might even conceptually approach the numerical aperture range from "0.17–0.34 or higher."

It is apparent from a detailed review of the foregoing publications that a macrolens system for emission microscopy which combines the desirable features of a high numerical optical aperture and low overall magnification with a wide field of view have been desired for some time but not been available as an optimized macrolens system.

Accordingly, it is desirable to provide an optimized macrolens system having these and other features suitable for incorporation into an emission microscope in which a number of auxiliary optical components can be provided as well.

SUMMARY OF THE INVENTION

It is the principal object of the present invention to provide a multiple lens element macrolens system operative as a single lens having a high light transmission value and a wide field of view in the object plane.

Another object of the invention is to provide a macrolens system having a long working distance to an object plane and a long back focal distance to an image plane.

A further object of the present invention is to provide a macrolens system having an object group of multiple lens elements separated by a large gap from an image group of multiple lens elements.

A still further object of the invention is to provide a macrolens system having high spatial resolution throughout a wavelength range extending from visible light to infrared wavelengths.

Briefly described, the present invention provides a multiple lens element macrolens system operative as a single lens and designed to provide the following major features which are desirable features of an emission microscope: a numerical aperture of the object (NAO) value in the range of from 0.32 to 0.4 in the object plane, an overall magnification in the range of from 0.8 to 1.0, a field of view of at least 18 mm×18 mm of an object to be viewed, an object working distance (wd) in the range of from 20 mm to 32 mm, a back focal distance (bfd) of at least 47 mm onto an image plane, and a gap sufficient to accommodate auxiliary elements of the microscope and may be of at least 95 mm along a central optical axis between a last lens element of an object group of lens elements and a first lens element of an image group of lens elements. Curved surfaces of individual lens elements of the macrolens system have a spherical curvature. The object group of multiple lens elements is disposed in one lens barrel which is mountable on a first turret of an optical emission microscope, and the image group of multiple lens elements is disposed in another lens barrel mountable on a second turret spaced from the first turret by the gap where the first and second turrets can be rotated so as to align along a common central optical axis both lens groups in the microscope, and to incorporate auxiliary optical components or systems within the gap between the object and image groups and between the image group and an image capture system. The macrolens system provides a modulation transfer function (MTF) across the image plane of at least 25% at a spatial frequency of 20 cycles per mm throughout a spectral range extending including the entire range over about 550 nm to about 1,000 nm and which may extend over a wavelength range within 380 nm to 1800 nm in bands of about 380–684 nm and about 1000–1800 nm or any band in which the ratio of the long to short wavelength is 1.8.

BRIEF DESCRIPTION OF THE DRAWINGS

The present invention will be better understood and appreciated more fully from the following detailed description, taken in conjunction with the accompanying drawings, in which.

DETAILED DESCRIPTION OF THE EMBODIMENTS

Figure 1:
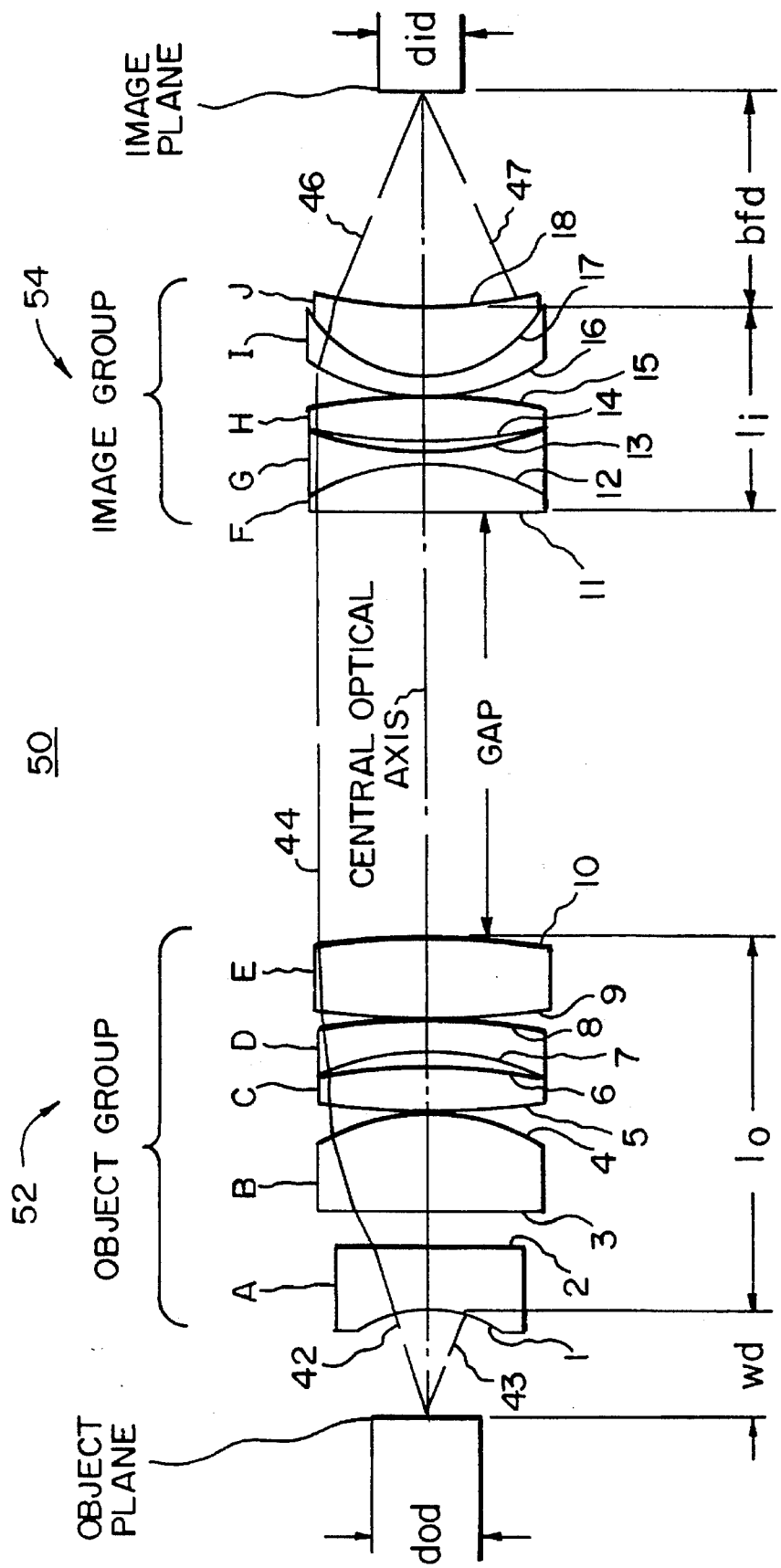
FIG. 1 shows a schematic side view of a first embodiment of a macrolens system in accordance with the present invention, in which multiple lens elements of an object group of lenses and of an image group of lenses and respective lens surfaces and system dimensions are indicated.

Referring now to FIG. 1, there is shown a first embodiment of a macrolens system 50. Along a central optical axis are arranged an object group 52 of lens elements A–E and an image group 54 of lens elements F–J with lens element surfaces indicated for each of the lens elements A–J. The first lens element A of the object group 52 is spaced from an object positioned in the object plane by a working distance wd of 25 millimeters (mm). The object group 52 has a total length $l_o$ along the central optical axis of about 83.225 mm, and the last lens surface 10 of lens element E of the object group 52 is spaced by a gap of 100.1 mm from a first lens surface 11 of a lens element F of the image group 54. The image group 54 of lens elements F–J extends axially by a length $l_i$ of about 50 mm, and a back focal distance bfd of 50.113 mm is achieved between a lens surface 18 of lens element J and an image capture system located in the image plane. The gap is selected to provide sufficient space to accommodate auxiliary elements of the microscope. By reducing the bfd to about 47 mm a gap of about 95 mm may be provided.

The object group 52 of the macrolens system 50 provides a field of view in the object plane of 18.75 mm×18.75 mm, shown here as a diagonal object dimension "dod" of about 26 mm, while the corresponding diagonal image dimension "did" in the image plane is about 21 mm, provided by a magnification of 0.8 of the lens elements F–J of the image group 54.

Rays 42 and 43 of light are schematically indicated as originating from the object plane at a point on the central optical axis. Light ray 42 is schematically traced through lens elements A–E of the object group 52 and is shown emanating from the output surface 10 of lens element E as a collimated ray 44. Ray 44 is received by the first surface 11 of lens element F of the image group 54 and is progressively refracted through lens elements F–J, thereby converging as a ray 46 (together with a companion ray 47) in a focal point on the image plane along the central optical axis.

In Table 1 there are indicated the elements of the macrolens system of FIG. 1, the respective lens element surfaces and associated surface radii, the thickness of the individual lens elements A–J along the central optical axis, the optical refractive index and the Abbe number, V of the respective lens element materials and the spacings between lens elements in (i.e., the air gaps) between respective lens elements. The indices of refraction are for the 0.5893 micron sodium D line of the spectrum. The Abbe numbers are calculated utilizing the D line index and, as the main dispersion, the index difference between the 0.4861 micron hydrogen F line and the 0.6563 micron hydrogen C line.

It should be noted that each air interface surface of each of the lens elements A–J may be provided with an anti-reflection coating (not shown), and that the object group 52 and the image group 54 of lens elements are disposed in separate and suitably machined lens barrels (not shown) which are mountable on separate and rotatable turrets within a microscope.

The macrolens system 50 in accordance with the present invention is a currently preferred embodiment in view of the relative ease of manufacturing of the lens elements A–J.

TABLE 1

| | | Design features of macrolens system 50 of FIG. 1 | | | | |
|---|---|---|---|---|---|---|
| ELEMENT | SURFACE # | SURFACE RADIUS (mm) | ELEMENT THICKNESS (mm) | ELEMENT REFRACTIVE INDEX | ELEMENT ABBE Number | ELEMENT SPACING (air; mm) |
| OBJECT | | INFINITY | | | | |
| | | | | | | 25.0000 |
| A | 1 | −30.7079 | 14.8400 | 1.805 | 25.4 | |
| | 2 | INFINITY | | | | |
| | | | | | | 7.717901 |
| B | 3 | INFINITY | 22.0000 | 1.803 | 46.7 | |
| | 4 | −43.8521 | | | | |
| | | | | | | 0.1000 |
| C | 5 | 194.4769 | 10.0000 | 1.640 | 60.1 | |
| | 6 | −113.1900 | | | | |
| | | | | | | 3.367135 |
| D | 7 | −52.6291 | 7.0000 | 1.805 | 25.4 | |
| | 8 | −171.7000 | | | | |
| | | | | | | 0.2000 |
| E | 9 | 370.1525 | 18.0000 | 1.620 | 60.3 | |
| | 10 | −152.030 | | | | |
| | | | | | | 100.1000 |
| F | 11 | INFINITY | 10.9000 | 1.803 | 46.7 | |
| and | 12 | −48.7682 | 2.7600 | 1.699 | 30.1 | |
| G | 13 | 66.6458 | | | | |
| | | | | | | 3.085487 |
| H | 14 | 155.0679 | 10.0000 | 1.803 | 46.7 | |
| | 15 | −136.0800 | | | | |
| | | | | | | 0.10000 |
| I | 16 | 49.1775 | 4.2000 | 1.805 | 25.4 | |
| and | 17 | 29.9493 | 17.0000 | 1.803 | 46.7 | |
| J | 18 | 159.4050 | | | | |
| | | | | | | 50.1130 |
| IMAGE | | INFINITY | | | | |

The macrolens system 50 has a modulation transfer function (MTF) across the image plane of at least 25% at a spatial frequency of 20 cycles per millimeter, and throughout a spectral range extending over about 550 nm to about 1,000 nm (over that entire spectral range). The modulation transfer function (MTF) of an optical system is a well-defined quantity and has been described in numerous publications, for example in "Modern Optical Engineering," second edition, pages 348–351, by Warren J. Smith. Briefly described, the MTF at a given spatial frequency n is defined as MTF $(n)=M_i/M_o$, where n is the spatial frequency in line pairs per unit length, $M_i$ is the modulation in the image plane, and $M_o$ is the modulation in the object plane. A line pair is a set of lines comprising a bright or white line and a dark line. With a typical value of $M_o=1$, the modulation transfer function is given by $$MTF = \frac{\text{maximum bright image} - \text{minimum bright image}}{\text{maximum bright image} + \text{minimum bright image}}$$

In Table 1, the working distance wd is 25.0000 mm, the gap between the object group and the image group of lens elements is 100.1000 mm, and the back focal distance bfd is 50.1130 mm. The axial length $l_o$ of the object group of lens elements A–E is the sum of the respective lens element thickness values and the sum of the respective lens element spacings, and has a value of 83.225036 mm. The axial length $l_i$ of the image group of lens elements F–J is similarly derived from the sum of the respective lens element thickness values and from the sum of the respective lens element spacings, and has a value of 48.045487 mm. The effective focal length of the object group, flo, is about 78.0 mm and the effective focal length of the image group, fli, is about 62.5 mm.

The effective focal length (efl) of a system is the distance from the principal point to the focal point. The focal points are those points at which light rays (from an infinitely distant axial object point) parallel to the optical axis are brought to a common focus on the axis. If the rays entering the system and those emerging from the system are extended until they intersect, the points of intersection will define a surface, usually referred to as the principal plane. The intersection of this surface with the axis is the principal point.

Accordingly, the macrolens system 50 corresponding to FIG. 1 and Table 1 can also be defined and scaled in accordance with the following relationships:

gap/flo≧1.2=(e.g., 1.28); gap/fli≧1.5=(e.g., 1.61)

gap/wd≦4.1 (e.g., 4.004); gap/bfd≦2.0 (e.g., 1.997)

flo/wd≦3.3 (e.g., 0.78); fli/bfd≦1.33 (e.g., 1.24)

The values of these ratios are approximate and can be varied by ±5% to accommodate manufacturing and assembly tolerances of the lens elements of the macrolens system 50.

Figure 2:
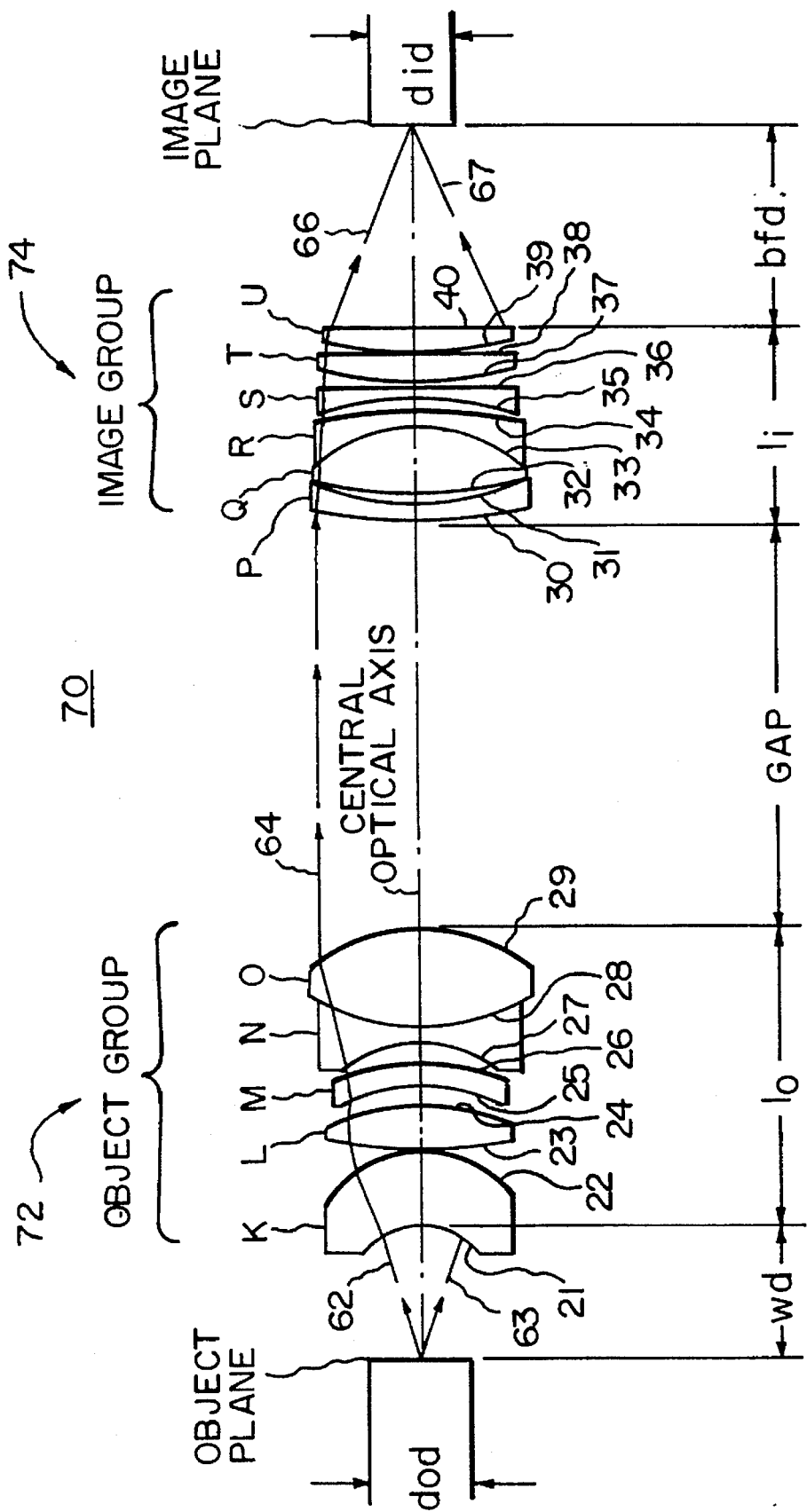
FIG. 2 depicts a schematic side view of a macrolens system in accordance with a second embodiment of the invention, in which lens elements of an object group and of an image group, respective lens surfaces and macrolens dimensions are indicated.

Referring now to FIG. 2, there is shown a schematic side view of a second embodiment of a macrolens system 70 having an object group 72 of lens elements K–O and an image group 74 of lens elements P–U arranged along a common central optical axis. All dimensional denotations of the macrolens system 70 correspond to the denotations of the macrolens system 50. However, in macrolens system 70 the working distance wd is 32.3 mm, the axial length lo of the object group 72 is about 72 mm, the gap between the object group 72 and the image group 74 is 100 mm, the axial length l of the image group 74 is 50 mm and the back focal distance bfd of the image group 74 is 50.24 mm. Light rays 62 and 63 are depicted as emanating from an object in the object plane at a point located on the central optical axis. Light ray 62 is shown traced through lens elements K–O of the object group and exiting surface 29 of lens element O as a collimated ray 64 which is accepted at the first surface 30 of lens element P of the image group 74 and being refracted through the lens elements P–U to exit as a ray 66 from surface 40 of lens element U and to converge (with a companion ray 67) to a focal point in the image plane along the central optical axis.

As in macrolens system 50, the field of view of the object group 72 is 18.75 mm×18.75 mm for a diagonal object dimension "dod" of about 26 mm. The image group 74 of lens elements P–U provides a magnification of 0.8, thereby resulting in a diagonal image dimension "did" of about 21 mm.

In Table 2 are identified the elements lens surfaces and associated radii, as well as lens element thicknesses, refractive index and Abbe number values and lens element spacings for the macrolens system 70 of FIG. 2.

The air interface surfaces of each of the lens elements K–U may be provided with a suitable anti-reflection coating, and the object group 72 of lens elements, as well as the image group 74 of lens elements are disposed in separate and suitably machined lens barrels (not shown).

In Table 2, the working distance wd is 32.33 mm, the gap between the object group and the image group of lens elements is 100.0000 mm, and the back focal distance bfd is 50.24 mm. The axial length $l_o$ of the object group of lens elements K–O is the sum of the respective lens element thickness values and the sum of the respective lens element spacings, and has a value of 72.511 mm. The axial length $l_i$ of the image group of lens elements P–U is similarly derived from the respective lens element thickness values and the associated lens element spacings, and has a value of 49.986 mm. The effective focal length of the object group, flo, is about 79.7 mm and the effective focal length of the image group, fli, is about 63.7 mm.

Accordingly, the macrolens system 70 corresponding to FIG. 2 and Table 2 can also be defined and scaled in accordance with the following relationships:

gap/flo≧1.2=(e.g., 1.25); gap/fli≧1.5=(e.g., 1.569)

gap/wd≦3.1 (e.g., 3.093); gap/bfd≦2.0 (e.g., 1.990)

flo/wd≦2.5 (e.g., 2.47); fli/bfd≦1.33 (e.g., 1.27)

The values of these ratios are approximate and can be varied by ±5% to accommodate manufacturing and assembly tolerances of the lens elements of the macrolens system 70.

The modulation transfer function (MTF) of the macrolens system 70 has a value of at least 25% across the image plane at a spatial frequency of 20 cycles per millimeter, and throughout a spectral range extending from about 550 nm to about 1,000 nm (over that entire spectral range).

Both lens systems 50 and 70 may be achromatized, by the technique of selection of glass for the elements with compensating incidies of refraction, or other conventional techniques, over portions of the visible band where the ratio of long to short wavelengths at opposite ends of the portions are approximately 1.8. Thus, for example achromatization can cover the following bands in the range 380–1800 nm; 380–684 nm; 550–1000 nm; and 100–1800 nm, or any other band in which the long to short wavelength is 1.8.

The surface radii (curvatures), element thicknesses, element spacings, and the element refractive index (glass type) of each of the lens elements of the lens designs of FIGS. 1 and 2 may be modified to obtain a NAO of about 0.40 and an overall magnification M=1.0, thereby varying the object working distance wd and the field of view in the object plane to be 20 mm, and 15 mm×15 mm, respectively.

TABLE 2

DESIGN FEATURES OF MACROLENS SYSTEM 70 OF FIG. 2

| ELEMENT | SURFACE # | SURFACE RADIUS (mm) | ELEMENT THICKNESS (mm) | ELEMENT REFRACTIVE INDEX | ELEMENT ABBE Number | ELEMENT SPACING (air; mm) |
|---|---|---|---|---|---|---|
| OBJECT | | INFINITY | | | | |
| | | | | | | 32.3300 |
| K | 21 | −20.5903 | 18.6250 | 1.883 | 40.8 | |
| | 22 | −29.6330 | | | | |
| | | | | | | 0.3000 |
| L | 23 | 177.8360 | 10.0000 | 1.883 | 40.8 | |
| | 24 | −63.1010 | | | | |
| | | | | | | 5.9470 |
| M | 25 | −39.3695 | 5.0000 | 1.805 | 25.4 | |
| | 26 | −60.5975 | | | | |
| | | | | | | 4.6380 |
| N | 27 | −35.0600 | 4.0000 | 1.805 | 25.4 | |
| and | 28 | 50.2278 | 24.0010 | 1.788 | 47.4 | |
| O | 29 | −46.3268 | | | | |
| | | | | | | 100.0000 |
| P | 30 | 96.006 | 5.0000 | 1.755 | 27.5 | |
| | 31 | 62.228 | | | | |
| | | | | | | 1.3430 |
| Q | 32 | 76.3130 | 18.4630 | 1.788 | 47.4 | |
| and | 33 | −36.9815 | 4.0000 | 1.805 | 25.4 | |
| R | 34 | −171.6000 | | | | |
| | | | | | | 2.5510 |
| S | 35 | −82.6930 | 4.0000 | 1.805 | 25.4 | |
| | 36 | 2624.0500 | | | | |
| | | | | | | 1.2610 |
| T | 37 | 98.8796 | 7.2000 | 1.883 | 40.8 | |

TABLE 2-continued

DESIGN FEATURES OF MACROLENS SYSTEM 70 OF FIG. 2

| ELEMENT | SURFACE # | SURFACE RADIUS (mm) | ELEMENT THICKNESS (mm) | ELEMENT REFRACTIVE INDEX | ELEMENT ABBE Number | ELEMENT SPACING (air; mm) |
|---|---|---|---|---|---|---|
|  | 38 | 775.9220 |  |  |  |  |
|  |  |  |  |  |  | 0.3000 |
| U | 39 | 96.5610 | 5.8680 | 1.883 | 40.8 |  |
|  | 40 | INFINITY |  |  |  |  |
|  |  |  |  |  |  | 50.2400 |
| IMAGE |  | INFINITY |  |  |  |  |

Figure 3:
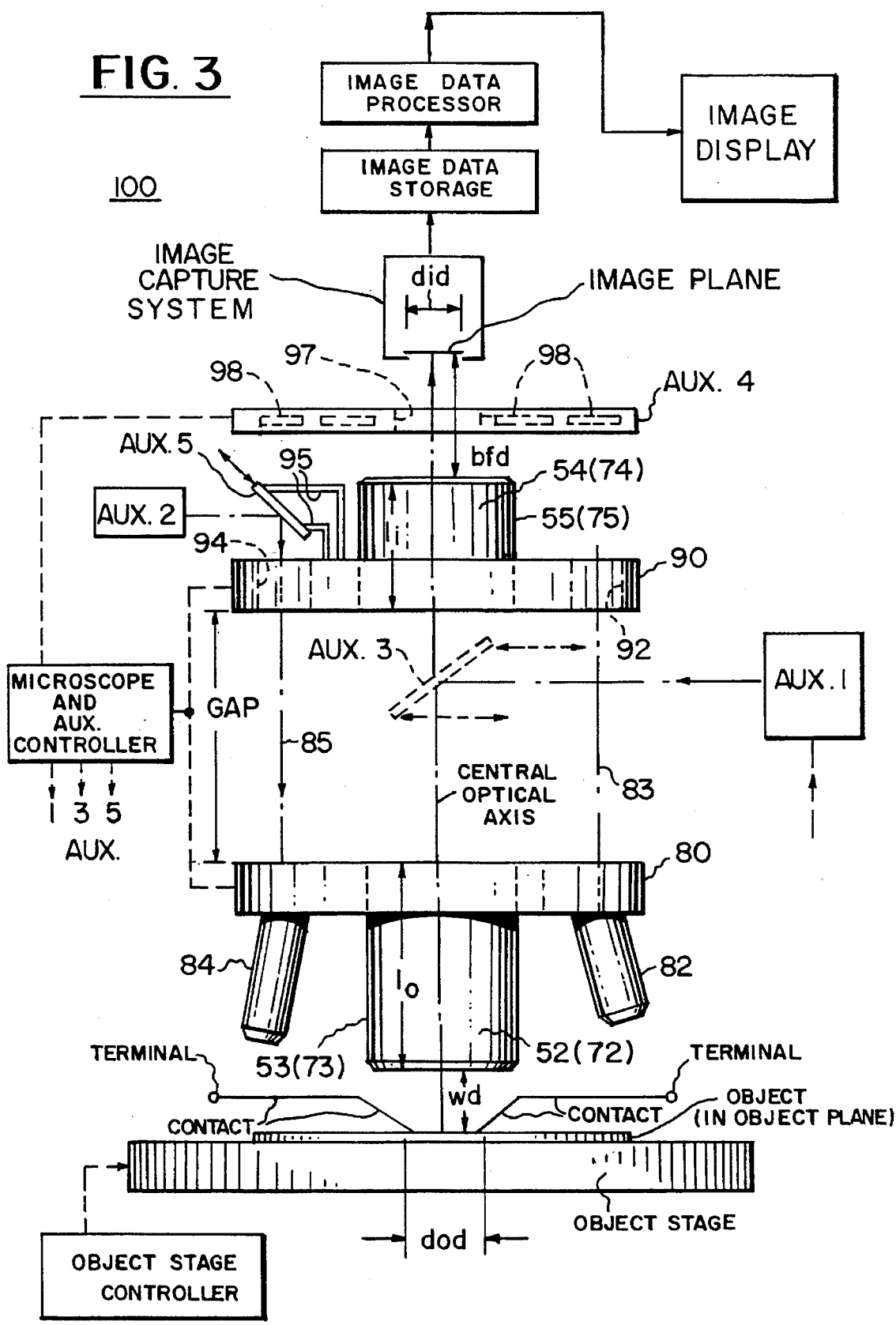
FIG. 3 is a schematic elevational view of a microscope incorporating a macrolens system in accordance with the present invention in conjunction with standard microscope objectives and auxiliary optical components to provide a suitable image display of an object being viewed while under electrical activation.

Referring now to FIG. 3, there is shown schematically an elevational view of a microscope system 100, which may be an emission microscope system. In correspondence with FIGS. 1 and 2, the axial dimensions wd, $l_o$, the gap, $l_i$, and bfd are indicated in FIG. 3 as well as the diagonal object and image dimensions "dod" and "did" to provide an appreciation of the importance these dimensions in an emission microscope configuration which also may include numerous auxiliary optical elements. Thus, the gap is selected to accommodate these auxiliary elements.

Briefly described, an object stage carries an object which may be a silicon wafer having a plurality of integrated circuits thereon. The object stage is controlled in X, Y, Z and rotational positions by an object stage controller schematically shown connected to the stage by a dotted connection. The stage is positioned such that an individual one of the plurality of integrated circuits on the wafer is centered and oriented about a central optical axis and at the working distance wd of the object group 52 (72) of the macrolens system 50 (70). The object group 52 (72) of lens elements is indicated as being disposed in a lens barrel 53 (73) which is mounted, preferably by a threaded mount, to a first selectably rotatable turret 80, the turret 80 also providing conventional microscope objectives, for example, objectives 82 and 84. Turret 80 is spaced by a gap (of about 100 mm) from a second selectably rotatable turret 90 which supports image group 54 (74) of lens elements disposed in a lens barrel 55 (75) and shown in optical alignment with the object group 52 (72) along the central optical axis. Interposed within the gap between the two turrets is shown, for exemplary purposes only, a tilted and selectably insertable element AUX.3 which may be a beam-splitting mirror or a reflective mirror to provide illumination from an auxiliary light source denoted as AUX.1. Various other known optical components may be positioned within the gap, for example, light polarizers, polarization analyzers or suitably configured microscope eye pieces and associated optical components.

Depicted schematically on the upper surface of turret 90 is an auxiliary optical component AUX.5 which may be a dielectric mirror mounted on legs or struts 95 to the turret 90, for deflecting for example a laser beam from an auxiliary laser AUX.2 toward microscope objective 84 which, when rotated into position and focused upon a domain of the integrated circuit under test, can be used to selectively ablate or repair certain microscopic features of the integrated circuit. Shown positioned within the back focal distance bfd of the image group 54 (74) of lens elements and an image plane of an image capture system is an auxiliary optical member AUX.4 which may be a selectably rotatable color filter wheel having color filters indicated at 98, and providing a clear aperture indicated at 97.

The conventional microscope objectives 82 and 84 are disposed on the turret 80 on respective optical axes 83 and 85 which extend through respective apertures 92 and 94 in the second turret 90. The synchronous rotation of turrets 80 and 90, and the selectable rotation of the color filter wheel AUX.4, as well as selectable activation and deactivation of the other auxiliary optical members may be conveniently controlled by a microscope and auxiliary controller as indicated by respective dotted connections.

An image capture system may be a conventional high sensitivity charge-coupled device camera used in conjunction with a known image-intensifying system. Image data provided by the image capture system can be stored in an image data storage means well known in the art and may be subsequently processed to display appropriate information derived from the semiconductor integrated circuit under investigation, where each one of the plurality of integrated circuits on a wafer may be electrically activated by contact wires or contact pins connected to appropriate electrical potentials via respective terminals.

Thus, while the various elements, components, or subsystems shown in FIG. 3 are well known, it is the features of the macrolens systems 50 and 70 in accordance with the present invention which provide for the options and advantages of incorporating various auxiliary optical elements and subsystems into a microscope and to view an object area of at least 15 mm–15 mm under either visual light conditions or under electrically activated light emission conditions.

From the foregoing description of the embodiments, it will be apparent that a multiple lens element optimized macrolens system has been provided which is operative as a single lens having a high light transmission value and a wide field of view of an object to be viewed. Each one of the two exemplary embodiments of the macrolens system provides an object working distance of at least 25 mm and a back focal distance to an image plane of at least 47 mm. The macrolens system includes an object group of multiple lens elements disposed in a lens barrel mountable on a first rotatable turret and separated along a central optical axis by a gap of at least 95 mm from an image group of multiple lens elements disposed in a lens barrel mountable on a second rotatable turret. The macrolens system is designed to be used advantageously in an emission microscope, wherein the macrolens system design provides for incorporation of various auxiliary optical elements or subsystems within such a microscope. Various modifications of the macrolens system may suggest themselves to those skilled in this art. For example, the axial length dimensions $l_o$ and $l_i$ of the object group and image group of lens elements, respectively, may be varied by varying the element-to-element spacing. The lens element thicknesses, radii of curvature of the lens elements, and the element refractive index or glass type may be varied within the spirit and scope of the invention, as defined in the claims.

What is claimed is:

1. A multiple lens element macrolens system operative as a single lens with a high light transmission value therethrough, the system comprising:

an object group of multiple lens elements having a common central optical axis and extending therealong by a distance $l_o$ and providing a numerical aperture (NAO) value in the range of from 0.32 to 0.40, a field of view of at least 15 mm×15 mm of an object to be viewed in an object plane, and an object working distance (wd) in the range of from 20–32.33 mm, the object group of lens elements producing at an output thereof substantially collimated rays of light from rays of light originating from the object in the object plane at a point on the central optical axis of the system; and an image group of multiple lens elements disposed along the common central optical axis and extending therealong by a distance $l_i$, a first lens element of the image group separated from a last element of the object group by a gap dimension of at least 95 mm along the central optical axis, the image group accepting at an input thereof the substantially collimated rays of light provided by the object group, and providing a focal point at a back focal distance (bfd) of at least 47 mm onto an image plane at a total magnification in the range of from 0.8 to 1.0 whereby a light transmission value sufficient for emission microscopy is achieved through the macrolens system.

2. The macrolens system of claim 1, wherein the curvature of each curved surface of each one of the multiple lens elements of the object group and of the image group is a spherical curvature.

3. The macrolens system of claim 1, wherein the object group has multiple lens elements A–E and the image group has multiple lens elements F–J, with lens element surfaces, lens element radii, lens element thicknesses along the central optical axis, refractive index and Abbe number values of lens element materials, and lens element air spacings along the central optical axis defined as follows:

| ELEMENT | SURFACE # | SURFACE RADIUS (mm) | ELEMENT THICKNESS (mm) | ELEMENT REFRACTIVE INDEX | ELEMENT ABBE Number | ELEMENT SPACING (air; mm) |
|---|---|---|---|---|---|---|
| OBJECT | | INFINITY | | | | |
| | | | | | | 25.0000 |
| A | 1 | −30.7079 | 14.8400 | 1.805 | 25.4 | |
| | 2 | INFINITY | | | | |
| | | | | | | 7.717901 |
| B | 3 | INFINITY | 22.0000 | 1.803 | 46.7 | |
| | 4 | −43.8521 | | | | |
| | | | | | | 0.1000 |
| C | 5 | 194.4769 | 10.0000 | 1.640 | 60.1 | |
| | 6 | −113.1900 | | | | |
| | | | | | | 3.367135 |
| D | 7 | −52.6291 | 7.0000 | 1.805 | 25.4 | |
| | 8 | −171.7000 | | | | |
| | | | | | | 0.2000 |
| E | 9 | 370.1525 | 18.0000 | 1.620 | 60.3 | |
| | 10 | −152.030 | | | | |
| | | | | | | 100.1000 |
| F | 11 | INFINITY | 10.9000 | 1.803 | 46.7 | |
| and | 12 | −48.7682 | 2.7600 | 1.699 | 30.1 | |
| G | 13 | 66.6458 | | | | |
| | | | | | | 3.085487 |
| H | 14 | 155.0679 | 10.0000 | 1.803 | 46.7 | |
| | 15 | −136.0800 | | | | |
| | | | | | | 0.10000 |
| I | 16 | 49.1775 | 4.2000 | 1.805 | 25.4 | |
| and | 17 | 29.9493 | 17.0000 | 1.803 | 46.7 | |
| J | 18 | 159.4050 | | | | |
| | | | | | | 50.1130 |
| IMAGE | | INFINITY | | | | |

4. The macrolens system of claim 1, wherein the object group has multiple lens elements K–O and the image group has multiple lens elements P–U, with lens element surfaces, lens element radii, lens element thicknesses along the central optical axis, refractive index and Abbe number values of lens element materials, and lens element air spacings along the central optical axis defined as follows:

| ELEMENT | SURFACE # | SURFACE RADIUS (mm) | ELEMENT THICKNESS (mm) | ELEMENT REFRACTIVE INDEX | ELEMENT ABBE Number | ELEMENT SPACING (air; mm) |
|---|---|---|---|---|---|---|
| OBJECT | | INFINITY | | | | |
| | | | | | | 32.3300 |
| K | 21 | −20.5903 | 18.6250 | 1.883 | 40.8 | |
| | 22 | −29.6330 | | | | |
| | | | | | | 0.3000 |
| L | 23 | 177.8360 | 10.0000 | 1.883 | 40.8 | |
| | 24 | −63.1010 | | | | |

-continued

| ELEMENT | SURFACE # | SURFACE RADIUS (mm) | ELEMENT THICKNESS (mm) | ELEMENT REFRACTIVE INDEX | ELEMENT ABBE Number | ELEMENT SPACING (air; mm) |
|---|---|---|---|---|---|---|
|  |  |  |  |  |  | 5.9470 |
| M | 25 | −39.3695 | 5.0000 | 1.805 | 25.4 |  |
|  | 26 | −60.5975 |  |  |  |  |
|  |  |  |  |  |  | 4.6380 |
| N | 27 | −35.0600 | 4.0000 | 1.805 | 25.4 |  |
| and | 28 | 50.2278 | 24.0010 | 1.788 | 47.4 |  |
| O | 29 | −46.3268 |  |  |  |  |
|  |  |  |  |  |  | 100.0000 |
| P | 30 | 96.006 | 5.0000 | 1.755 | 27.5 |  |
|  | 31 | 62.228 |  |  |  |  |
|  |  |  |  |  |  | 1.3430 |
| Q | 32 | 76.3130 | 18.4630 | 1.788 | 47.4 |  |
| and | 33 | −36.9815 | 4.0000 | 1.805 | 25.4 |  |
| R | 34 | −171.6000 |  |  |  |  |
|  |  |  |  |  |  | 2.5510 |
| S | 35 | −82.6930 | 4.0000 | 1.805 | 25.4 |  |
|  | 36 | 2624.0500 |  |  |  |  |
|  |  |  |  |  |  | 1.2610 |
| T | 37 | 98.8796 | 7.2000 | 1.883 | 40.8 |  |
|  | 38 | 775.9220 |  |  |  |  |
|  |  |  |  |  |  | 0.3000 |
| U | 39 | 96.5610 | 5.8680 | 1.883 | 40.8 |  |
|  | 40 | INFINITY |  |  |  |  |
|  |  |  |  |  |  | 50.2400 |
| IMAGE |  | INFINITY |  |  |  |  |

5. The macrolens system of claim 1, wherein the object group of multiple lens elements is disposed in a first lens barrel mountable on a first turret of an optical instrument, and the image group of multiple lens elements is disposed in a second lens barrel mountable on a second turret of the optical instrument, the first and second turrets rotatable so that the object group and the image group are aligned along the common central optical axis when the macrolens system is to be operative in the optical instrument.

6. The macrolens system of claim 1, wherein the system has a modulation transfer function (MTF) across the image plane of at least 25% at a spatial frequency of 20 cycles per millimeter throughout an equally weighted spectral range extending over about 550 nm to about 1,000 nm.

7. The macrolens system of claim 1, wherein the system has a modulation transfer function (MTF) across the image plane of at least 25% at a spatial frequency of 20 cycles per millimeter throughout an equally weighted spectral range extending within 380 nm to 1800 nm and wherein said spectral range occupies bands in which the ratio of long to short wavelengths at opposite ends of each said band is about 1.8.

8. The macrolens system of claim 1, wherein the system has a modulation transfer function (MTF) across the image plane of at least 25% at a spatial frequency of 20 cycles per millimeter throughout an equally weighted spectral range extending within 380 nm to 1800 nm and wherein said spectral range occupies bands from about 380 nm to 684 nm and about 1000 nm to 1800 nm.

9. A multiple lens element macrolens system operative as a single lens with a high light transmission value therethrough, the system comprising:

an object group of multiple lens elements having a common central optical axis and extending therealong by a distance $l_o$, an image group of multiple lens elements disposed along the common central optical axis and extending therealong by a distance $l_i$, a first lens element of the image group separated from a last element of the object group by a gap along the central optical axis, the image group accepting at an input thereof the substantially collimated rays of light provided by the object group, and providing a focal point at a back focal distance (bfd) onto an image plane; and the system having the following relationships expressed as the following approximate ratios:

gap/flobj ≥ 1.2; gap/flimg ≥ 1.5 gap/wd ≤ 4.1; gap/bfd ≤ 2.0 flobj/wd ≤ 3.3; flimg/bfd ≤ 1.33 where flobj=EFFECTIVE FOCAL LENGTH OF OBJECT GROUP flimg= EFFECTIVE FOCAL LENGTH OF IMAGE GROUP wd=AN OBJECT WORKING DISTANCE.

10. A multiple lens element macrolens system operative as a single lens with a high light transmission value therethrough, the system comprising:

an object group of multiple lens elements having a common central optical axis and extending therealong by a distance $l_o$, an image group of multiple lens elements disposed along the common central optical axis and extending therealong by a distance $l_i$, a first lens element of the image group separated from a last element of the object group by a gap along the central optical axis, the image group accepting at in input thereof substantially collimated rays of light provided by the object group, and providing a focal point at a back focal distance (bfd) onto an image plane; and the system having the following relationships expressed as the following approximate ratios:

gap/flobj ≥ 1.2; gap/flimg ≥ 1.50 gap/wd ≤ 3.1; gap/bfd ≤ 2.0 flobj/wd ≤ 2.5; flimg/bfd ≤ 1.33 where flobj=EFFECTIVE FOCAL LENGTH OF OBJECT GROUP flimg=EFFECTIVE FOCAL LENGTH OF IMAGE GROUP wd=AN OBJECT WORKING DISTANCE.

\* \* \* \* \*